(12) United States Patent
Park et al.

(10) Patent No.: US 9,711,245 B2
(45) Date of Patent: Jul. 18, 2017

(54) MAGNETIC JACK TYPE CONTROL ELEMENT DRIVE MECHANISM FOR PRECISION POSITION CONTROL OF CONTROL ELEMENT ASSEMBLY

(71) Applicant: Kepco Engineering & Construction Company, Inc., Gyeonggi-do (KR)

(72) Inventors: Jin Seok Park, Daejeon (KR); Yong Tae Jang, Daejeon (KR); Myoung Goo Lee, Daejeon (KR); Sang Gyoon Chang, Daejeon (KR); Dae Hee Lee, Daejeon (KR)

(73) Assignee: KEPCO ENGINEERING & CONSTRUCTION COMPANY, INC., Gyeonggo-Do (KR)

( * ) Notice: Subject to any disclaimer, the term of this patent is extended or adjusted under 35 U.S.C. 154(b) by 449 days.

(21) Appl. No.: 14/717,879

(22) Filed: May 20, 2015

(65) Prior Publication Data
US 2016/0141945 A1 May 19, 2016

(30) Foreign Application Priority Data
Nov. 13, 2014 (KR) .......................... 10-2014-0158062

(51) Int. Cl.
*H02K 41/03* (2006.01)
*G21C 7/14* (2006.01)

(52) U.S. Cl.
CPC ............... *G21C 7/14* (2013.01); *H02K 41/03* (2013.01); *H02K 41/031* (2013.01); *Y02E 30/39* (2013.01)

(58) Field of Classification Search
CPC ........ G21C 7/14; H02K 41/03–41/035; H02K 41/0356; H02K 33/12
(Continued)

(56) References Cited

U.S. PATENT DOCUMENTS 3,158,766 A * 11/1964 Frisch ..................... F16H 27/02
310/14
3,445,690 A * 5/1969 Sherwood ................ G21C 7/14
310/14
(Continued)

FOREIGN PATENT DOCUMENTS

JP   H10-319165 A   12/1998
JP   2006-177882 A   7/2006
(Continued)

OTHER PUBLICATIONS

Notice of Allowance, dated Feb. 23, 2016, issued in Korean Patent Application No. 10-2014-0158062, 6 pages.

*Primary Examiner* — Ramon M Barrera
(74) *Attorney, Agent, or Firm* — Nixon Peabody LLP; Khaled Shami (57) ABSTRACT

A magnetic jack type control element drive mechanism for precision position control of a control element assembly, satisfies the following conditions:

$D1=D2=P+D5;$ $D3=P\times 2;$ $D4=D3\times(N-\frac{1}{2})$, ($N$ is an arbitrary natural number), wherein
D1 represents a lift gap of the upper motor assembly;
D2 represents a lift gap of the lower motor assembly;
D3 represents a space width between tips of adjacent teeth of the drive shaft;
D4 represents a gap between an upper latch and a lower latch;
P represents pitch that is a distance of ascent or descent of the drive shaft; and
D5 represents a margin which is a separation space between the teeth and the upper latch or the lower latch
(Continued)

when the upper latch or the lower latch is inserted into the teeth of the drive shaft.

4 Claims, 11 Drawing Sheets

(58) Field of Classification Search
USPC ........... 310/12.17, 12.25, 12.31, 14; 376/228
See application file for complete search history.

(56) References Cited

U.S. PATENT DOCUMENTS

| 3,480,807 | A | * | 11/1969 | Downs | G21C 7/12 |
| | | | | | 310/12.04 |
| 3,626,493 | A | * | 12/1971 | Behmke | G21C 7/14 |
| | | | | | 226/112 |
| 3,765,585 | A | * | 10/1973 | Ruoss | G21C 7/14 |
| | | | | | 226/145 |
| 3,853,699 | A | * | 12/1974 | Frisch | G21C 7/12 |
| | | | | | 376/228 |
| 3,902,963 | A | * | 9/1975 | Bertone | G21C 7/12 |
| | | | | | 310/14 |
| 3,946,258 | A | * | 3/1976 | Leshem | G21C 7/14 |
| | | | | | 310/14 |
| 3,959,071 | A | * | 5/1976 | Bevilacqua | G21C 7/12 |
| | | | | | 310/14 |
| 4,597,934 | A | * | 7/1986 | Bollinger | G21C 7/12 |
| | | | | | 376/228 |
| 7,505,545 | B2 | * | 3/2009 | Kim | G21C 7/12 |
| | | | | | 376/219 |
| 2012/0148007 | A1 | | 6/2012 | Allen et al. | |

FOREIGN PATENT DOCUMENTS

| KR | 10-2011-0137535 A | 12/2011 |
| KR | 10-2012-0086904 | 8/2012 |
| KR | 10-2013-0140063 A | 12/2013 |

* cited by examiner

MAGNETIC JACK TYPE CONTROL ELEMENT DRIVE MECHANISM FOR PRECISION POSITION CONTROL OF CONTROL ELEMENT ASSEMBLY

CROSS-REFERENCE TO RELATED PATENT APPLICATION

This application claims the benefit of Korean Patent Application No. 10-2014-0158062, filed on Nov. 13, 2014, in the Korean Intellectual Property Office, the disclosure of which is incorporated herein in its entirety by reference.

BACKGROUND OF THE INVENTION

1. Field of the Invention

One or more exemplary embodiments relate to a magnetic jack type control element drive mechanism for precision position control of a control element assembly, and more particularly, to a control element drive mechanism which is applied to a 4-coil magnetic jack type control element drive mechanism to increase resolution of position control of a motor assembly.

The present invention is derived from research conducted as part of the Nuclear Power Core Technology Development Program by the Ministry of Trade, Industry & Energy [Project Serial Number: 20131510101680, Title of Research Project: Development of Top-Mounted ICI System and In-Vessel Control Element Drive Mechanism for Severe Accident Mitigation Design.

2. Description of the Related Art

A control element drive mechanism is provided to control the power of a nuclear reactor and is classified as, for example, a magnetic-jack type control element drive mechanism, a ball-screw type control element drive mechanism, and a hydraulic type control element drive mechanism. The present invention relates to a magnetic jack type control element drive mechanism.

Figure 1:
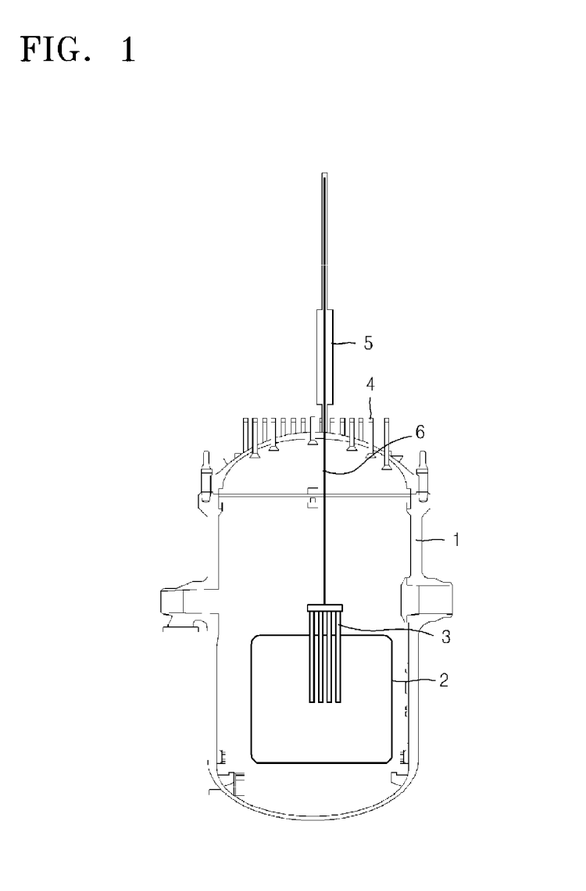
FIG. 1 is a conceptual view of a conventional control element drive mechanism used for installation thereof.
Figure 2:
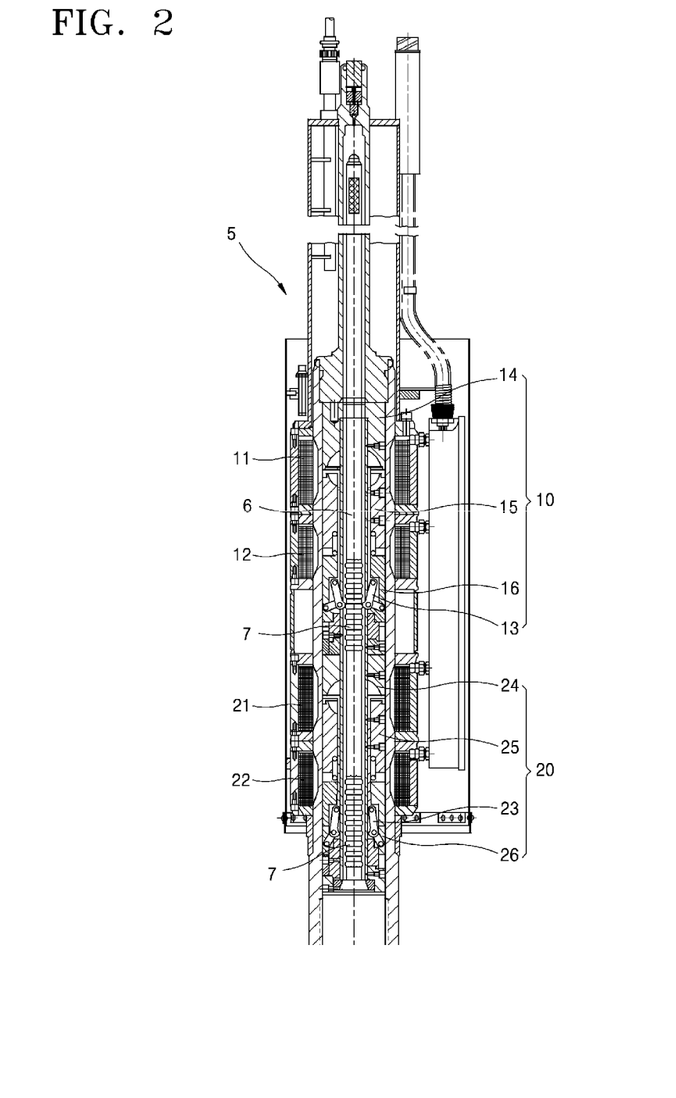
FIG. 2 is a schematic cross-sectional view of a conventional control element drive mechanism.
Figure 3:
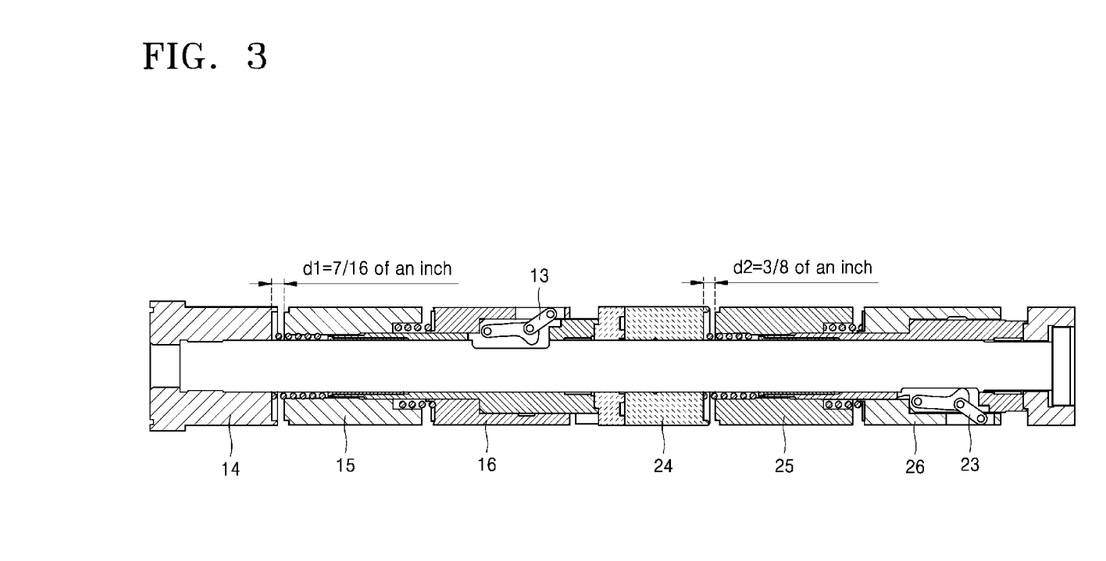
FIG. 3 is a magnified cross-sectional view illustrating the main portion of FIG. 2.
Figure 4:
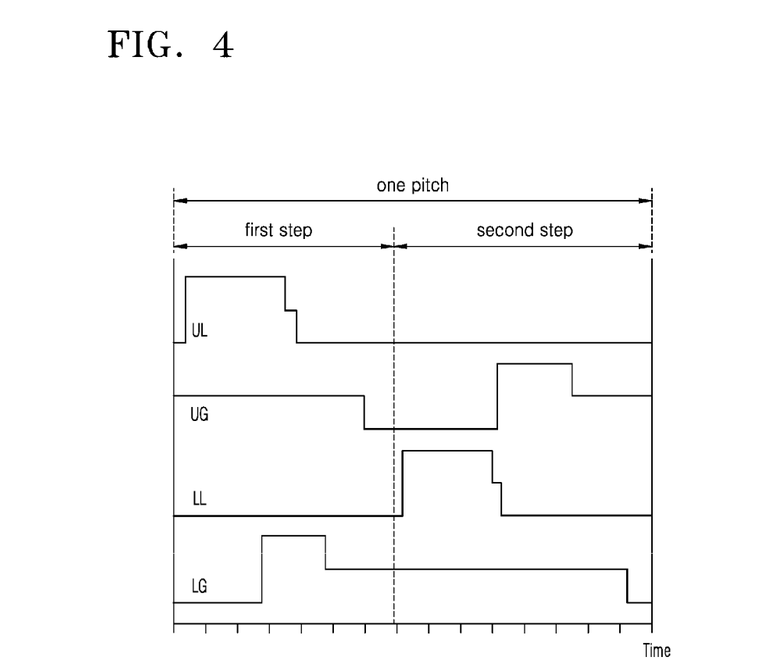
FIG. 4 is a view of a sequential operation of a control element being withdrawn by a conventional control element drive mechanism.

FIG. 1 is a conceptual diagram of a control element drive mechanism used for installation thereof, and FIG. 2 is a schematic cross-sectional view of a conventional control element drive mechanism. FIG. 3 is a magnified cross-sectional view illustrating the main portion of FIG. 2, and FIG. 4 shows a sequence of a control element being withdrawn by a conventional control element drive mechanism.

As shown in FIG. 1, a nuclear fuel assembly 2 and a control element 3 are placed in a nuclear reactor 1. The control element 3 controls the fission of the nuclear fuel by adjusting the number of neutrons absorbed by a nuclear fuel. The control element 3 is connected to a control element drive shaft 6. The control element 3 is vertically driven up and down by a control element drive mechanism 5. For the installation of the control element drive mechanism 5, a nozzle 4 is placed on an upper portion of the nuclear reactor 1.

As shown in FIG. 2, the control element drive mechanism 5, which may be a 4-coil type control element drive mechanism, includes an upper motor assembly 10, a lower motor assembly 20, and a control element drive coil.

The upper motor assembly 10 includes an upper latch 13, an upper stationary magnet 14, an upper lift magnet 15, and an upper latch magnet 16. Meanwhile, the lower motor assembly 20 includes a lower latch 23, a lower stationary magnet 24, a lower lift magnet 25, and a lower latch magnet 26.

The control element drive coil includes an upper lifting (UL) coil 11, an upper gripper (UG) coil 12, a lower lifting (LL) coil 21, and a lower gripper (LG) coil 22. The control element drive mechanism 5 controls the vertical movement of the control element 3 by controlling the magnetic force generated by the four coils.

In detail, a 4-coil magnetic jack type control element drive mechanism operates a motor assembly in a double-step manner. A first step occurs at the upper motor assembly 10, and a second step occurs at the lower motor assembly 20. The first step and the second step constitute a pitch.

Operation of the motor assembly in the double-step manner will be explained in detail by referring to FIG. 4, as follows. For the convenience of explanation, a sequence of withdrawing a control element is provided herein. A process of inserting the control element will be carried out in the reverse order of the withdrawing sequence.

The first step is completed by the operation of the upper motor assembly 10. In detail, when current is provided to the UG coil 12, an upper latch 13 engages with teeth 7 of the control element drive shaft 6, whereafter current is provided to the UL coil 11 and the upper lift magnet 14 ascends to drive up the control element drive shaft 6. When current is applied to the LG coil 22, the lower latch 23 engages with the teeth 7 of the control element drive shaft 6, whereafter the current supply to the UL coil 11 and the UG coil 12 is blocked to make the control element drive shaft 6 remain elevated.

Meanwhile, the second step is completed by the operation of the lower motor assembly 20. In detail, following a last phase of the first step, current is provided to the LL coil 21 and a lower lift magnet 25 is driven up, and current is provided to the UG coil 12 and the upper latch 13 engages with the teeth 7 of the control element drive shaft 6, whereafter the current supply to the LL coil 21 and LG coil 22 is blocked. As a result, the upper latch 13 is engaged with the teeth 7 of the control element drive shaft 6 to make the control element drive shaft 6 remain elevated.

As explained before, the conventional control element drive mechanism completes one pitch of ascending or descending the control element drive shaft 6 only when the first and second steps are all completed.

As shown in FIG. 3, a lift gap (d1) of the upper motor assembly 10 and a lift gap (d2) of the lower motor assembly 20 are $7/16$ of an inch and $3/8$ of an inch, respectively. When the upper motor assembly 10 and the lower motor assembly 20 operate a lifting operation, a space margin between the upper latch 13 and the teeth 7 of the control element drive shaft 6 or a space margin between the lower latch 23 and the teeth 7 of the control element drive shaft 6 is given as $1/32$ inch.

Therefore, when the upper motor assembly 10 operates, the control element drive shaft 6 ascends or descends by $(7/16 - 1/32)$ of an inch; when the lower motor assembly 20 operates, the control element drive shaft 6 ascends or descends by $(3/8 - 1/32)$ inch.

As a result, the distance moved in the first step is different from the distance moved in the second step, and one pitch of moving the control element drive shaft 6 is completed with each sequential operation of the upper motor assembly 10 and the lower motor assembly 20.

A final one pitch completed by the operation of the upper motor assembly 10 and the lower motor assembly 20 is calculated using the following formula:

$$\text{Final one pitch} = 7/16 \text{ of an inch} - 1/32 \text{ inch} + 3/8 \text{ of an inch} - 1/32 \text{ inch} = 24/32 \text{ inch} = 3/4 \text{ inch}.$$

As explained herein above, the operation type of a conventional control element drive mechanism has a position control resolution of ¾ inch. However, such a conventional method is not precise enough to be used in a small reactor; therefore, there has been a demand for a control element drive mechanism with precise position control capacity.

SUMMARY OF THE INVENTION

One or more exemplary embodiments include a magnetic jack type control element drive mechanism for precision position control of the control element assembly, which is applied to a 4-coil type control element drive mechanism to improve a position control resolution of a motor assembly.

Additional aspects will be set forth in part in the description which follows and, in part, will be apparent from the description, or may be learned by practice of the presented embodiments.

According to an aspect of exemplary embodiments, provided is a magnetic jack type control element drive mechanism for precision position control of the control element assembly, wherein the magnetic jack type control element drive mechanism is applied as a 4-coil type control element drive mechanism, includes an upper motor assembly and a lower motor assembly, which drive up and down a control element drive shaft, and satisfies the following formulas:

$$D1=D2=P+D5 \qquad (1)$$

$$D3=P\times 2; \text{ and} \qquad (2)$$

$$D4=D3\times(N-\tfrac{1}{2}), (N \text{ is an arbitrary natural number}), \qquad (3)$$

wherein D1 represents a lift gap of the upper motor assembly, D2 represents a lift gap of the lower motor assembly, D3 represents a space width between adjacent tips of teeth of the control element drive shaft, D4 represents a gap between a upper latch located at the upper motor assembly and a lower latch located at the lower motor assembly, P represents a pitch that is a distance of ascent or descent of the control element drive shaft by operating the upper motor assembly or the lower motor assembly, and D5 represents a margin which is the separation space between the teeth and the upper latch or between the teeth and the lower latch when the upper latch or the lower latch is inserted into the teeth of the control element drive shaft.

In some embodiments, P is 10 mm or smaller.

In some embodiments, D5 is equal to or greater than 0.1 mm and equal to or smaller than 1.0 mm.

In some embodiments, N is 10 or more.

BRIEF DESCRIPTION OF THE DRAWINGS

These and/or other aspects will become apparent and more readily appreciated from the following description of the embodiments, taken in conjunction with the accompanying views of which.

DETAILED DESCRIPTION

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description.

One or more embodiments of the present invention relates to a magnetic jack type control element drive mechanism which is operated as a 4-coil type. A control element drive mechanism according to an embodiment of the present invention may be applied to a reactor which needs precise position control of a control element, particularly to a small reactor which requires a precise position control capacity in terms of its characteristics.

Hereinafter, exemplary embodiments of the present invention will be explained in detail by referring to the attached drawings.

Figure 5:
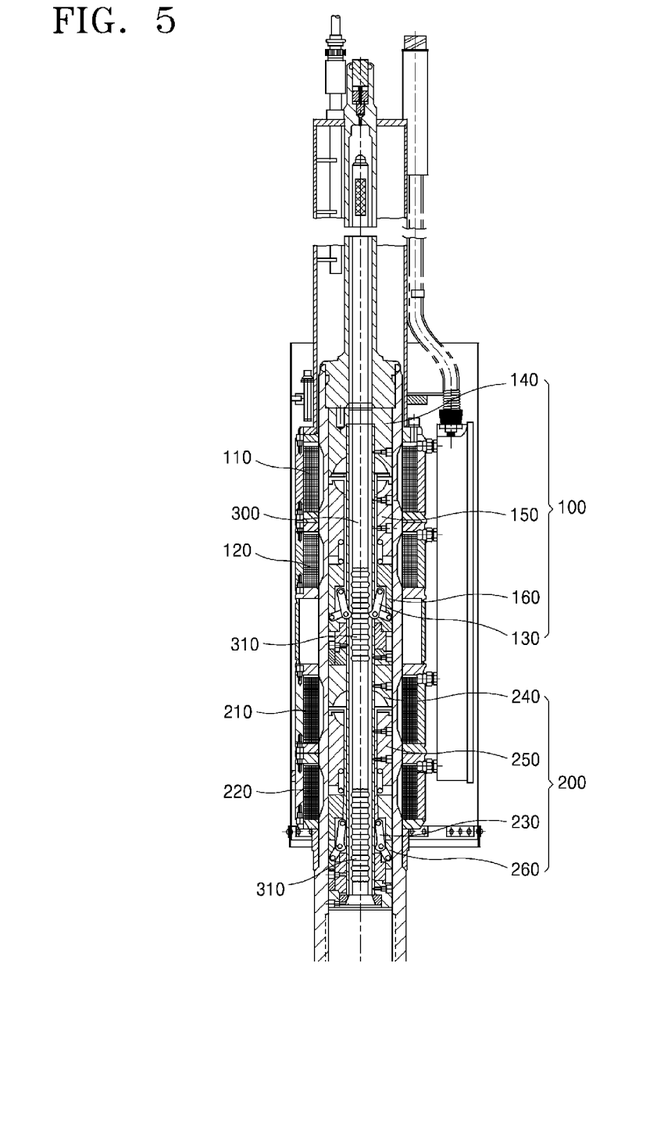
FIG. 5 is a schematic cross-sectional view of a control element drive mechanism according to an embodiment of the present invention.
Figure 6:
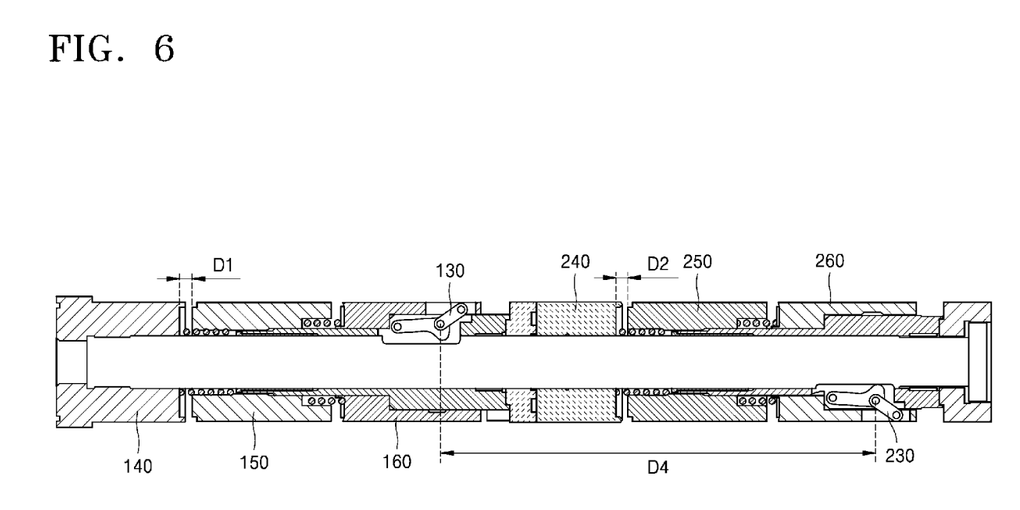
FIG. 6 is a magnified cross-sectional view illustrating the main portion of FIG. 5.
Figure 7:
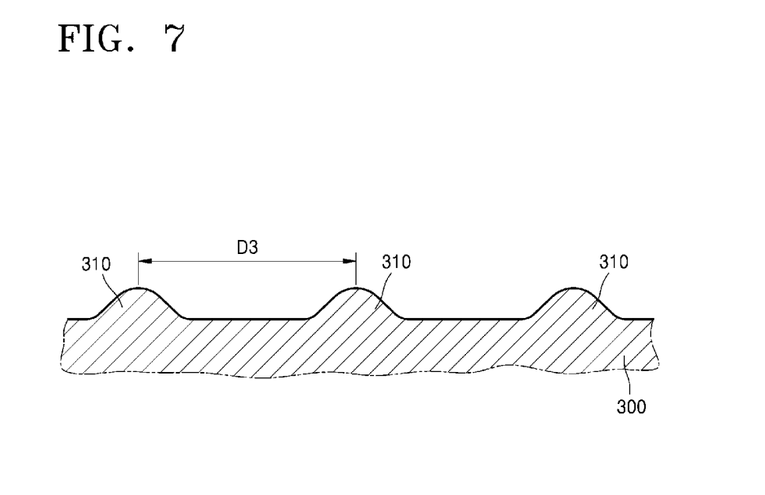
FIG. 7 is a view of a space width between adjacent tips of teeth of a control element drive shaft.
Figure 8:
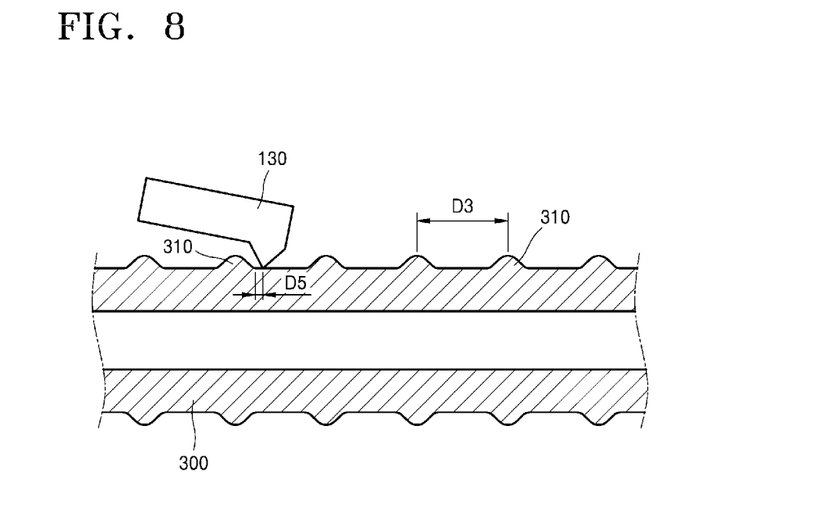
FIG. 8 is a view of a space margin when a latch approaches toward the teeth of the control element drive shaft.
Figure 9:
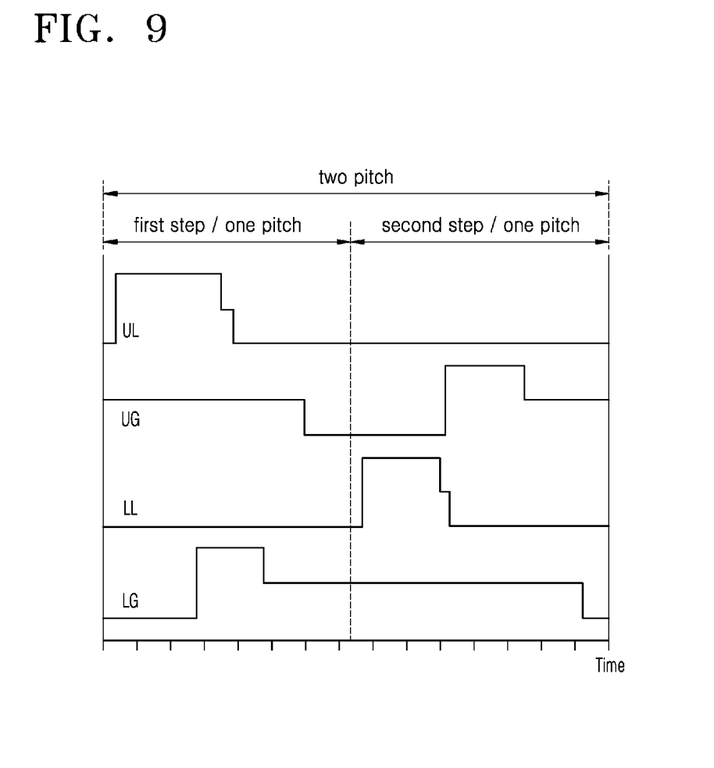
FIG. 9 is a view of a sequential progression of withdrawing the control element, according to an embodiment of the present invention.
Figure 10:
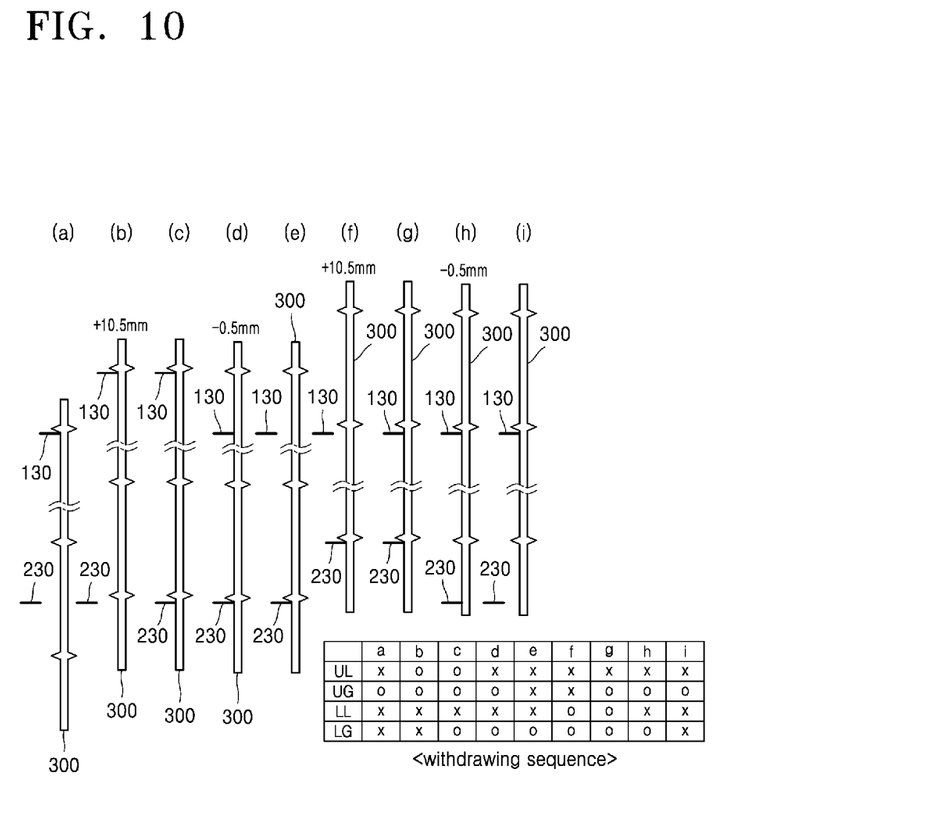
FIG. 10 is a schematic view of how a control element drive shaft ascends according to the sequence explained in connection with FIG. 9.
Figure 11:
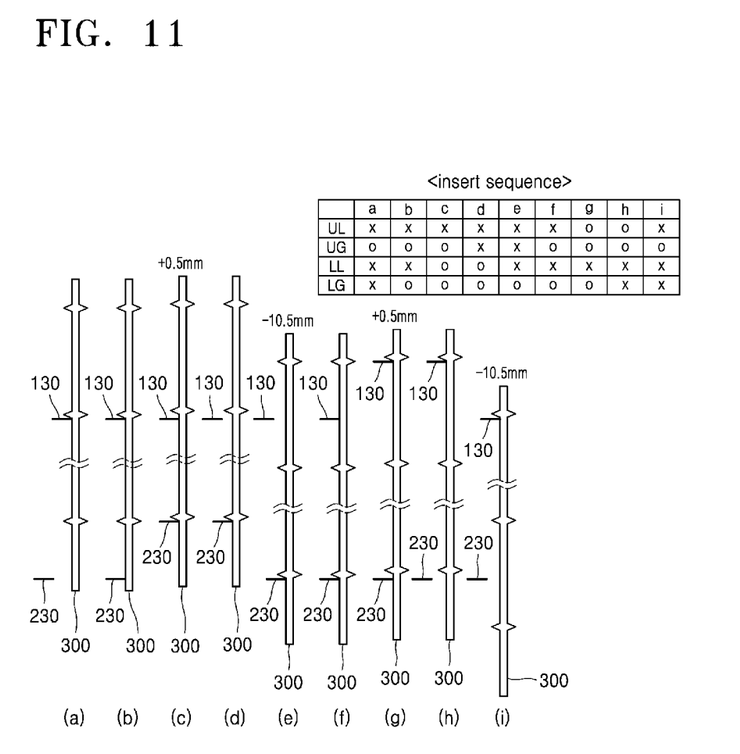
FIG. 11 is a schematic view of how the control element drive shaft descends, according to an embodiment of the present invention.
Figure 12:
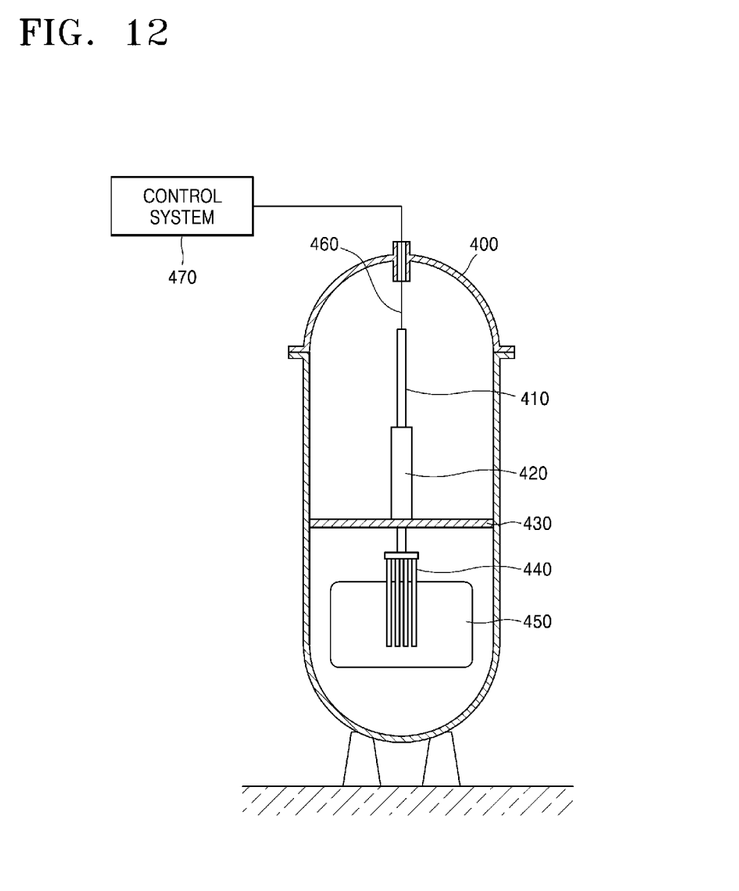
FIG. 12 is a view of the state of a control element drive mechanism installed inside a reactor, according to an embodiment of the present invention.

FIG. 5 is a schematic cross-sectional view of a control element drive mechanism according to an embodiment of the present invention, FIG. 6 is a magnified cross-sectional view illustrating the main portion of FIG. 5, FIG. 7 is a view of a space width between adjacent tips of teeth of a control element drive shaft, FIG. 8 is a view of a space margin when a latch approaches toward the teeth of the control element drive shaft, FIG. 9 is a view of a sequential progression of withdrawing the control element, according to an embodiment of the present invention, FIG. 10 is a schematic view of how a control element drive shaft ascends according to the sequence explained in connection with FIG. 9, FIG. 11 is a schematic view of how the control element drive shaft descends, according to an embodiment of the present invention, and FIG. 12 is a view of the state of a control element drive mechanism installed inside a reactor, according to an embodiment of the present invention.

As shown in FIG. 4, in a control element drive mechanism according to an embodiment of the present invention, when an upper motor assembly 100 and a lower motor assembly 200 operates, a pitch for which the control element drive shaft 300 ascends or descends in a first step where the upper motor assembly 100 operates is configured to be equal to a pitch for which the control element drive shaft 300 ascends or descends in the second step where the lower motor assembly 200 operates; therefore, in a 4-coil type control element drive mechanism where the upper motor assembly 100 and the lower motor assembly 200 operate in sequence, the resolution of position control is improved. In this regard, the space width between adjacent tips of the teeth of the control element drive shaft 200 is designed to become twice as wide as the pitch; therefore the constraints of the pitch caused due to too tight space width between adjacent tips of the teeth may less occur.

Above all, as shown in FIG. 5, a 4-coil type control element drive mechanism includes the upper motor assembly 100, the lower motor assembly 200, and the control element drive coil. The upper motor assembly 100 includes an upper latch 130, an upper stationary magnet 140, an upper lifting magnet 150, and an upper latch magnet 160. The lower motor assembly 200 includes a lower latch 230, a lower stationary magnet 240, a lower lifting magnet 250 and a lower latch magnet 260.

The control element drive coil includes an upper lifting (UL) coil, an upper gripper (UG) coil 120, a lower lifting (LL) coil 210, and a lower gripper (LG) coil 220. With a sequential operation of the four coils—UL coil 110, UG coil 120, LL coil 210, and LG coil—the control element drive shaft 300 ascends or descends; and as a result the control element which is connected to the control element drive shaft 300 ascends or descends.

As shown in FIGS. 6 to 8, a control element drive mechanism according to an embodiment of the present invention satisfies the following formulae:

$$D1=D2=P+D5 \quad (1)$$

$$D3=P\times 2; \text{ and} \quad (2)$$

$$D4=D3\times(N-\tfrac{1}{2}), (N \text{ is an arbitrary natural number}), \quad (3)$$

wherein D1 represents a lift gap of the upper motor assembly, D2 represents a lift gap of the lower motor assembly, D3 represents a space width between adjacent tips of teeth of the control element drive shaft, D4 represents a gap between a upper latch located at the upper motor assembly and a lower latch located at the lower motor assembly, P represents a pitch that is a distance of ascent or descent of the control element drive shaft by operating the upper motor assembly or the lower motor assembly, and D5 represents a space margin between the teeth and the upper latch or between the teeth and the lower latch when the upper latch or the lower latch is inserted into the teeth of the control element drive shaft.

In detail, D1 means the gap of the ascent of the upper lift magnet 150 when current is provided to the UL coil 110. D2 means the gap of the ascent of the lower lift magnet 250 when current is provided to the LL coil 210

D3 means the width between adjacent tips of the teeth 310, as shown in FIG. 7. The 4-coil magnetic jack type control element drive mechanism includes the upper latch 130 and the lower latch 230 as a pair; D4 means the distance between the upper latch 130 which constitutes the upper motor assembly 100 and the lower latch 230 which constitutes the upper motor assembly 200.

P means the unit increment distance of the ascent (the withdrawing process of the control element) or the descent (the insertion process of the control element) of the control element drive shaft 300, when the upper motor assembly 100 or the lower motor assembly 200 operates.

In some embodiments, as shown in FIG. 8, the upper latch 130 and the lower latch 230 is designed such that when the upper latch 130 or the lower latch 230 is engaged with the teeth 310 of the control element drive shaft 300, the upper latch 130 or the lower latch 230 approaches the teeth 310 with a little space in between. D5 represents the space margin.

Here again, the conditions of the aforementioned formulas are explained in detail as follows.

I. Explanation of the Formula (1)

According to an embodiment of the present invention, D1 equals D2 while D1 and D2 are set to have the distance of P plus D5.

In some embodiments, according to an embodiment of the present invention, P is 10 mm or smaller while D5 is equal to or greater than 0.1 mm and equal to or smaller than 1.0 mm. While the conventional control element drive mechanism has a resolution of ¾ inch (approximately 19.05 mm), embodiments of the present invention provide a more precise resolution.

II. Explanation of the Formula (2)

According to an embodiment of the present invention, the value of D3 is twice the value of P. In other words, the sum of the distance (P) of the ascent or descent of the control element drive shaft 300 driven by the operation of the upper motor assembly 100 and the distance (P) of the ascent or descent of the control element drive shaft 300 driven by the operation of the lower motor assembly 200 is equal to the space width between adjacent tips of the teeth 310 of the control element drive shaft 300. The space width between adjacent tips of the teeth 310 is one of integral factors that affect control precision of the magnetic jack type control element drive mechanism. According to embodiments of the present invention, the teeth are placed at intervals of double the pitch, which is very advantageous compared to a conventional method.

III. Explanation of the Formula (3)

D4, which is the separation space between the upper latch 130 and the lower latch 230, is given as the value of multiplying the space width between adjacent tips of the teeth 310 of the control element drive shaft 300 by (natural number −0.5). In some embodiments, D4 is also equal to the value determined by subtracting P from the distance calculated by multiplying a natural number by the space width between adjacent tips of the teeth 310 of the control element drive shaft 300, as follows.

$$D4=D3\times(N-\tfrac{1}{2})=(P\times 2\times N)-(P\times 2\times \tfrac{1}{2})=(P\times 2\times N)-P$$

According to an embodiment of the present invention, N is given as 10 or greater.

According to an embodiment of the formula, the design of the following may be considered. In the embodiment of the present invention, when the resolution of position control by the control element drive mechanism is designed to set at 10 mm and the margin D5 is designed to set at 0.5 mm, The lift gap D1 of the upper motor assembly 100 and the lift gap D2 of the lower motor assembly 200 are given as 10 mm+0.5 mm=10.5 mm. The space width D3 between adjacent tips of the teeth 310 is given as 10 mm×2=20 mm. The separation space D4 between the upper latch 130 and the lower latch 230 may be given as 20 mm×(23½)=450 mm (here, N is set at 23).

However, the above-mentioned numbers are only examples; there may be various designs as long as the formulas (1) to (3) are satisfied. For example, when the natural number applied to the space width between adjacent tips of the teeth 310 of the control element drive mechanism is set at 10, the space width between the upper latch 130 and the lower latch 230 is given as 20 mm×(10½)=190 mm. Such a result may be achieved when the sizes of the upper stationary magnet 140, the upper lift magnet 150, the upper latch magnet 160, the lower stationary magnet 240, the lower lifting magnet 250, and the lower latch magnet 260, which constitute the upper motor assembly 100 (첨가) and the lower motor assembly 200, are reduced to less than half of what their respective sizes are at N=23.

Hereinafter, by referring to FIGS. 9 to 11, how a control element drive mechanism according to an embodiment of the present invention having the configurations described above operates will be explained in detail.

The upper motor assembly 100 and the lower motor assembly 200 operate in sequence, which is the same as in a conventional control element drive mechanism. However, according to an embodiment of the present invention, when the upper motor assembly 100 operates, a pitch of the movement of the control element drive shaft 300 is completed, and when the lower motor assembly 200 operates, another pitch of the movement of the control element drive shaft 300 is completed. In other words, when the upper motor assembly 100 and the lower motor assembly 200 operate once for each in sequence, the control element drive shaft 300 moves by a distance equal to twice the pitch. FIGS. 9, 10, and 11 show an example in which D1=D2=10.5 mm, P=10 mm, D3=20 mm, and D5=0.5 mm are given. In FIGS. 10 and 11, ±10.5 mm means the ascent or descent by 10.5 mm and ±0.5 mm means the ascent or descent by 0.5 mm.

First, by referring to FIGS. 9 and 10, how the control element drive shaft 300 ascends according to the sequence of withdrawing of a control element will be explained in detail.

As shown in FIG. 10(*a*), when current is provided to the UG coil 120 of the upper motor assembly 100, the upper latch 130 is engaged with the teeth 310 of the control element drive shaft 300. This is the initial stage for the ascent of the control element drive shaft 300. At this stage, the lower latch 230 remains disengaged from the teeth 310 of the control element drive shaft 300. In a table in FIG. 10, the state of current being provided to the 4 coils is marked as O and the state of current not being provided is marked as X.

As shown in FIG. 10(*b*), when current is provided to the UL coil 110, the upper lift magnet 150 ascends and simultaneously the control element drive shaft 300 ascends.

As shown in FIG. 10(*c*), when current is provided to the LG coil 220, the lower latch 230 enters between the teeth 310 of the control element drive shaft 300. At this stage, the lower latch 230 remains apart from the teeth 310 of the control element drive shaft 300 as much as the margin.

As shown in FIG. 10(*d*), when the current supply to the UL coil 110 is blocked, the control element drive shaft 300 descends as much as the margin and, is latched onto the lower latch 230 which has come between the teeth 310 of the control element drive shaft 300 at stage (c). As shown in FIG. 10, during stages from (a) to (d), the current remains provided to the UG coil 120.

Then, as shown in FIG. 10(*e*), the current supply to the UG coil 120 is blocked. At this stage, the current remains provided to the LG coil 220. As a result, the state in which the upper latch 130 is engaged with the teeth 310 of the control element drive shaft 300 by the UG coil 220 at stage (a) turns into a state in which the lower latch 230 is engaged with the teeth 310 of the control element drive shaft 300 by the LG coil 220 at stage (e). In stage (a) through stage (e), the control element drive shaft 300 ascends as much as half of the space width D3 between adjacent tips of the teeth, i.e., P as required.

Next, as shown in FIG. 10(*f*), when current is provided to the LL coil 210, the lower lifting magnet 250 ascends and simultaneously the control element drive shaft 300 ascends.

As shown in FIG. 10(*g*), when current is provided to the UG coil 120, the upper latch 130 enters onto the teeth 310 of the control element drive shaft 300. At this stage, the upper latch 130 remains apart from the teeth 310 of the control element drive shaft 300 as much as the margin.

As shown in FIG. 10(*h*), when the current supply to the LL coil 210 is blocked, the control element drive shaft 300 descends as much as the margin and get engaged with the upper latch 130 which has come into the teeth 310 of the control element drive shaft 300 at stage (g).

Then, as shown in FIG. 10(*i*), the current supply to the LG coil 220 is blocked. At this stage, the current remains provided to the UG coil 120. As a result, the state in which the lower latch 230 gets latched onto the teeth 310 of the control element drive shaft 300 by the LG coil 220 at stage (e) turns into the state in which the upper latch 130 gets latched onto the teeth 310 of the control element drive shaft 300 by the UG coil 120 at stage (i), i.e., back to stage (a). From stage (f) to stage (i), the control element drive shaft 300 ascends as much as half of the space width between adjacent tips of the teeth D3, i.e., P as required.

As a result, a pitch of the ascent of the control element drive shaft 300 when transitioning from stage (a) to stage (e) is the same as a pitch of the ascent of the control element drive shaft 300 when transitioning from stage (f) to stage (i); and, according to an embodiment of the present invention, 2 pitches are completed while a cycle of 8 sequences occurs with a sequence including the sequential operation of the upper motor assembly 100 and the lower motor assembly 200.

FIG. 11 shows how the control element drive shaft 300 descends.

As shown in FIG. 11(*a*), when current is provided to UG coil 120 of the upper motor assembly 100, the upper latch 130 gets latched onto the teeth 310 of the control element drive shaft 300. This is the initial stage for the descent of the control element drive shaft 300. At this stage, the lower latch 230 remains disengaged from the teeth 310 of the control element drive shaft 300. In a table in FIG. 11, the state of current being admitted to the 4 coils is marked as O and the state of current not being admitted is marked as X.

As shown in FIG. 11(*b*), when current is provided to the LG coil 220, the lower latch 230 enters between the teeth 310 of the control element drive shaft 300. According to an embodiment of the present invention, the upper latch 130 is engaged with the teeth 310 of the control element drive shaft 300 while the lower latch 230 is located below the upper latch 130 with a space of (N+0.5)×D3 in between. In other words, the lower latch 230 is located in the middle of the space width between adjacent tips of the teeth of the control element drive shaft 300.

As shown in FIG. 11(*c*), when current is provided to the LL coil 210, the lower latch 230 ascends and gets engaged with the teeth 310 of the control element drive shaft 300. At this stage, the lower latch 230 is raised by the height of a pitch plus the margin, and the upper latch 130 is located downward as low as D5 from the teeth 310 of the control element drive shaft 300.

As shown in FIG. 11(*d*), the current supply to the UG coil 120 is blocked, and the upper latch 130 is detached from the teeth 310 of the control element drive shaft 300.

As shown in FIG. 11(*e*), when the current supply to the LL coil 210 is blocked, the control element drive shaft 300 descends while the lower latch 230 remains engaged with the control element drive shaft 300. As a result, like the way the upper latch 130 gets engaged with the teeth 310 of the control element drive shaft 300 by the UG coil 120 at stage (a) shown in FIG. 11, the lower latch 230 get engaged with the teeth 310 of the control element drive shaft 300 by the LG coil 220 at stage (e). At this stage, the control element drive shaft 300 descends as low as one pitch.

Then, as shown in FIG. 11(*f*), when current is provided to the UG coil 120, the upper latch 130 enters between the teeth 310 of the control element drive shaft 300. According to an embodiment of the present invention, the lower latch 230 remains latched onto the teeth 310 of the control element drive shaft 300 while the upper latch 130 is located above the lower latch 230 with a space of (N+0.5)×D3 in between. In other words, the upper latch 130 is located in the middle of the space width between adjacent tips of the teeth of the control element drive shaft 300.

As shown in FIG. 11(*g*), when current is provided to the UL coil 110, the upper latch 130 ascends and gets engaged with the teeth 310 of the control element drive shaft 300. At this stage, the upper latch 130 is raised by the height of a pitch plus the margin, and the lower latch 230 is located downward as low as D5, from the teeth 310 of the control element drive shaft 300.

As shown in FIG. 11(*h*), when the current supply to the LG coil 220 is blocked, the lower latch 230 is disengaged from the teeth 310 of the control element drive shaft 300.

Finally, as shown in FIG. 11(*i*), when the current supply to the UL coil 110 is blocked, the control element drive shaft 300 descends while the upper latch 130 remains latched with the control element drive shaft 300. At this stage, the upper latch 130 descends as low as D1; therefore, the control element drive shaft 300 descends as low as D1. As a result, like the way the lower latch 230 gets latched onto the teeth 310 of the control element drive shaft 300 by the LG coil 220 at stage (e) shown in FIG. 11, the upper latch 130 gets latched onto the teeth 310 of the control element drive shaft 300 by the UG coil 120 at stage (i). At this stage, the control element drive shaft 300 descends as low as one pitch.

As aforementioned, the control element drive shaft 300 descends as much as one pitch while going through from stage (a) to stage (e), another pitch from stage (f) to stage (i).

As a result, the pitch of the descent of the control element drive shaft 300 while going through from stage (a) to stage (e) is the same as the pitch of the descent of the control element drive shaft 300 while going through from stage (f) to stage (i); and, according to an embodiment of the present invention, 2 pitches are completed while a cycle of 8 sequences occurs with a sequence including the sequential operation of the upper motor assembly 100 and the lower motor assembly 200.

As explained before, a magnetic jack type control element drive mechanism for precision position control of a control element assembly according to an embodiment of the present invention controls the distance of the ascent and descent of the control element drive shaft 300 more precisely than a conventional control element drive mechanism.

In other words, a conventional control element drive mechanism is configured to complete a pitch when the upper motor assembly 100 and the lower motor assembly 200 operate once for each in a sequential manner; also, the resolution of position control of the control element drive shaft 300 provided for the conventional control element drive mechanism is ¾ inch, which is relatively large. However, according to an embodiment of the present invention, 2 pitches are completed when the upper motor assembly 100 and the lower motor assembly 200 operate once for each in a sequential manner; particularly, one pitch is completed when the upper motor assembly 100 operates and another pitch when the lower motor assembly 200 operates, tremendously increasing the resolution of position control of the control element drive shaft 300.

In some embodiments, as shown in FIG. 12, the control element drive mechanism according to an embodiment of the present invention may be installed inside a reactor 400. Inside the reactor 400, a nuclear fuel assembly 450 is placed, and a control element 400 is connected to a control element drive shaft 410; a separate support structure 430 is placed to install the control element drive mechanism 420. In some embodiments, a cable 460 for providing the power supply to the control element drive mechanism 420 is connected to a control system 470 configured outside of the reactor 400 while penetrating the reactor head. In other words, a control element drive mechanism according to an embodiment of the present invention may be installed and operated as an in-vessel type inside the reactor for a small and medium-sized reactor. Of course, it is also possible to be installed outside a reactor.

A magnetic jack type control element drive mechanism for precision position control of the control element assembly according to an embodiment of the present invention increases the position control resolution of a motor assembly.

Also, it provides even greater capacity for precise control of the reactor control element by increasing the position control resolution of the motor assembly.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. A magnetic jack type control element drive mechanism for precision position control of a control element assembly, wherein the magnetic jack type control element drive mechanism is a 4-coil type control element drive mechanism, the magnetic jack type control element drive mechanism comprising an upper motor assembly and a lower motor assembly which drive a control element up and down along a control element drive shaft, wherein the magnetic jack type control element drive mechanism satisfies the following conditions:

$$D1=D2=P+D5 \qquad (1)$$

$$D3=P\times 2 \qquad (2)$$

$$D4=D3\times(N-\tfrac{1}{2}), \text{ wherein } N \text{ is an arbitrary natural number}, \qquad (3)$$

wherein

D1 represents a lift gap of the upper motor assembly;
D2 represents a lift gap of the lower motor assembly;
D3 represents a distance between tips of adjacent teeth of the control element drive shaft;

D4 represents a gap between an upper latch constituting the upper motor assembly and a lower latch constituting the lower motor assembly;

P represents a pitch indicating a distance the control element drive shaft ascends or descends when operating the upper motor assembly or the lower motor assembly; and D5 represents a margin which is a separation space between the teeth and the upper latch or the lower latch when the upper latch or the lower latch is inserted into the teeth of the control element drive shaft.

2. The magnetic jack type control element drive mechanism of claim 1, wherein P is 10 mm or smaller.

3. The magnetic jack type control element drive mechanism of claim 1, wherein D5 is equal to or greater than 0.1 mm and equal to or smaller than 1.0 mm.

4. The magnetic jack type control element drive mechanism of claim 1, wherein N is 10 or larger.

* * * * *